(12) United States Patent
Becker

(10) Patent No.: US 11,773,325 B2
(45) Date of Patent: Oct. 3, 2023

(54) SOIL TREATMENT USING PEROXIDE

(71) Applicant: Arkema Inc., King of Prussia, PA (US)

(72) Inventor: Christian Guy Becker, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 162 days.

(21) Appl. No.: 16/976,195

(22) PCT Filed: Feb. 4, 2019

(86) PCT No.: PCT/US2019/016448
§ 371 (c)(1),
(2) Date: Aug. 27, 2020

(87) PCT Pub. No.: WO2019/168635
PCT Pub. Date: Sep. 6, 2019

(65) Prior Publication Data
US 2021/0002552 A1    Jan. 7, 2021

Related U.S. Application Data

(60) Provisional application No. 62/760,939, filed on Nov. 14, 2018, provisional application No. 62/636,866, filed on Mar. 1, 2018.

(51) Int. Cl.
*C09K 17/02* (2006.01)
*C09K 17/14* (2006.01)
*A01N 59/00* (2006.01)

(52) U.S. Cl.
CPC ............. *C09K 17/02* (2013.01); *A01N 59/00* (2013.01); *C09K 17/14* (2013.01)

(58) Field of Classification Search
None
See application file for complete search history.

(56) References Cited

U.S. PATENT DOCUMENTS

| | | | |
|---|---|---|---|
| 3,912,490 A | 10/1975 | Boghosian | |
| 5,607,856 A | 3/1997 | Moon et al. | |
| 6,197,784 B1 | 3/2001 | Fuchs et al. | |
| 9,668,475 B2 | 6/2017 | Charles et al. | |
| 2004/0087665 A1 | 5/2004 | Aubert et al. | |
| 2010/0129157 A1 | 5/2010 | Reddy et al. | |
| 2010/0209193 A1 | 8/2010 | Hong et al. | |
| 2011/0179841 A1* | 7/2011 | Lu ........................ | C05F 17/50 71/12 |

FOREIGN PATENT DOCUMENTS

| | | | | |
|---|---|---|---|---|
| CN | 101716358 | | 6/2010 | |
| CN | 102228900 A | * | 11/2011 | |
| CN | 102701881 | | 10/2012 | |
| CN | 105238410 A | | 1/2016 | |
| CN | 204951688 | | 1/2016 | |
| CN | 106376336 | | 2/2017 | |
| CN | 106668890 | | 5/2017 | |
| CN | 108377818 | | 8/2018 | |
| DE | 3810163 A | * | 10/1989 | ............. A01B 19/06 |
| EP | 0035800 | | 9/1981 | |
| GB | 1234512 | | 6/1971 | |
| GB | 2152377 A | | 8/1985 | |
| JP | 57026607 | | 2/1982 | |
| JP | 11220959 | | 8/1999 | |
| JP | 2008272530 | | 11/2008 | |
| KR | 200239688 | | 4/2010 | |
| KR | 100958847 | | 6/2010 | |
| KR | 20130045467 | | 5/2013 | |
| KR | 20140103405 | * | 1/2014 | |
| WO | WO 2018/073718 A1 | | 4/2018 | |

OTHER PUBLICATIONS

EP 0533494 A2 Mar. 1993 (Year: 1993).*
CN 108160693 Jun. 2018 (Year: 2018).*
Anonymous Soil Steam Sterilization—Wikipedia; retrieved from the Internet: URL:https://web.archive.org/web/20170215154233/ https://en.wikipedia.org/wiki/soil_steam-sterilization [retrieved on Sep. 29, 2021]; whole document Feb. 15, 2017.
Soil Science, J. Johnson, Soil-Steaming for Disease Control, Jan. 1946, vol. 61, issue 1, p. 83-92.
Hort. Technology, Rainbolt, et al., Steam as a Preplant Soil Disifestant Tool, Apr. 2013 , vol. 23, No. 2, 207-214.
Crop Protection, Samtani et al., Evaluation of non-fumigant alternatived, vol. 30, Issue 1, Jan. 2011, 45-51.
Hort. Science, Samtani et al., Effects of Steam and Solarization, 47(1):64-70, 2012.
Hort. Science, Fennimore, et al., Evaluation of Mobile Steam, 49(12):1542-1549, 2014.
HortTechnology, Sydorovych, et al., Economic Evaluation of Methyl Bromide, 18(4): 705-713, Oct.-Dec. 2008.
Rev. Fitotec, Mex., Cuervo-Usan et al., Effectiveness of peroxidies in soil disinfection in relation with strawberry cultivation in the Mediterranean, vol. 37 (4): 393-398, 201.
Chemosphere, Kong et al., Treatment of Petroleum-Contaminated Soils Using Iron Mineral Catalyzed Hydrogen Peroxide, vol. 37, No. 8, pp. 1473-1482, 1998.

(Continued)

*Primary Examiner* — Charles R Nold
(74) *Attorney, Agent, or Firm* — Lynn B. Morreale

(57) ABSTRACT

A method of incorporating a peroxide source that produces reactive oxygen species and optionally also incorporating steam with the peroxide source (or other source of heat), into soil as a method of soil remediation, i.e., to destroy or remove chemical contaminants that pose a threat to plant or animal life. The invention also relates to the use of the peroxide source along with optional steam (or other heat source) or hot vaporized peroxide solution to treat soils, in particular those intended for agriculture, as a pesticide for controlling nematodes, pathogenic fungi, insect pests and bacteria. The peroxide source may be applied to the soil using soil cultivation equipment to increase contact between the peroxide source and the soil to be treated. The peroxide source and/or steam or other source of heat or hot vaporized peroxide solution can also be applied with injection wells or infiltration galleries, for instance, for the pesticide use and soil remediation.

20 Claims, No Drawings

(56) References Cited

OTHER PUBLICATIONS

Biologicheskil Zhurnal Armenil, Gevorkyan etal., Kinetics of hydrogen peroxide decomposition by soil, vol. 36, Issue 4, pp. 291-294, Journal, 1983 Abstract Only.
Can. J. Microbiol., Anderson et al., Catalase activity and the survival of Pseudomonas putida, a root colonizer, upon treatment with peracetic acid. 47: 222-228 (2001).
Adv. Hort. Sci., Luvisi, et al., Control of Soil-borne Diseases, 2008 22(3): 174-181.
EPA, Davis, Steam Injection for Soil and Aquifer Remediation, Ground water issue, EPA/540/S-97/505, Jan. 1998.
EPA, In-Situ Steam/Hot-Air Soil Stripping, Demonstration Bulletin, EPA/540/MS-90/003, Feb. 1990.
Journal of Hazardous Materials. Watts, et al., Hydrogen Peroxide Decomposition, B69, 229-243, 1999.
J. Environ. Eng., Watts, et al., Chemistry Of Modified Fentons Reagent, 131(4), 612-622, 2005.
Seidler Chemical Co, Inc., "Using Peroxides for Remediation", http://www.seidlerchem.com/using-peroxides-for-remediation.htm. pp. 1-10. Aug. 2020.

\* cited by examiner

US 11,773,325 B2

SOIL TREATMENT USING PEROXIDE

This present application is the national phase under 35 USC § 371 of prior PCT International Application Number PCT/US2019/016448 filed Feb. 4, 2019 which designated the United States of America and claimed priority to United States Provisional Patent Applications Ser. No. 62/636,866 filed Mar. 1, 2018 and 62/760,939 filed Nov. 14, 2018.

FIELD OF THE INVENTION

The present invention relates methods for treating soil wherein a peroxide-based treatment (comprising a source of peroxide) and, optionally, a source of heat, is or are applied to the soil. The application results in either or both of i) the peroxide-based treatment being mixed into the soil and ii) the temperature of the soil being raised above its initial temperature.

According to one embodiment, the invention relates to the use of heat in combination with hydrogen peroxide ($H_2O_2$) or a peroxide source, e.g., peracetic acid, sodium peroxide, potassium oxide, potassium peroxide, calcium peroxide, magnesium peroxide, urea peroxide, organic hydroperoxides (ROOH), organic peroxides (ROOR), and superoxides, wherein R is an alkane, alkene or alkyne, branched or unbranched, and of between 1 and 12 carbons or is an aromatic ring usually of 6 carbons, or a combination of such rings, or other compounds that can produce reactive oxygen species, to remediate (i.e., decompose or remove harmful chemicals) soils or as a pesticide for controlling nematodes, pathogenic fungi, insect pests and bacteria. The heat is preferably applied as steam, but resistive heating and the application of heat using hot air are not beyond the scope of the invention. If the source of the peroxide is an aqueous solution, the peroxide solution itself may be heated above its boiling point and applied as the combined heat source and peroxide source. The steam and peroxide or peroxide source or peroxide solution above its boiling point can be applied to the soil using soil cultivation equipment in order to increase the contact between the peroxide and the soil or substrate to be treated. The steam and peroxide treatment is suitable for agriculture and horticulture, including gardening and specialty crops. Hydrogen peroxide has the great advantage of leaving no residues and being environmentally benign to the soil. The present invention relates, in certain embodiments, to the combination of hydrogen peroxide and steam to increase the speed of disinfection and increase efficacy. The synergy between the heat and the peroxide results in higher sterilization and disinfection efficacy than can be attained by peroxide or steam used independently. The increased speed of both application and efficacy lead to a reduction in energy consumption and labor time that would translate in a reduction in total cost per treated hectare and would thus compete in total cost with the traditional chemical fumigant options. The combination of heat and peroxide likewise increase the speed and effectiveness of soil remediation. The heat serves to volatilize the more volatile compounds, as well as increase the reaction speed of the decomposition of harmful chemicals by peroxide.

BACKGROUND OF THE INVENTION

Pesticides are commonly applied to soil or substrates to be planted (i.e., planting media or plant substrates). The purpose of these pesticides is to prepare the soil by killing or immobilizing bacteria, fungi, insects, nematodes as well as killing weeds and weed seeds that are harmful to the crop that is to be planted. The use of such pesticides increases crop yield. Pesticidal techniques are used widely today on soils or plant substrates, in particular those intended for intensive agriculture such as tree cultivation, horticulture and for market gardening.

Such disinfection techniques have in the past used at least one fumigant which generally is a volatile pesticidal compound. These volatile compounds are introduced into the soil using nozzles according to various techniques known to those skilled in the art. Generally, they are introduced into the upper layers of the soil either concurrently with, or immediately following, the cultivation step.

These volatile fumigants diffuse into and through the soil to be disinfected but because they are gaseous, also rise back up to the surface and can be dissipated into the atmosphere, due to their volatility. Large amounts of fumigant can thus be lost, leading to a reduction in efficacy of the product used. In addition, the fumigant dissipated into the atmosphere can be a nuisance or can even be toxic for farmers and the environment in the immediate proximity of the crops and the field that was treated.

In order to overcome this drawback, it is common practice to cover the soil treated by fumigation with a polymer film which is impermeable to the vapors of the fumigant. This gas impermeable plastic sheet prevents the fumigant from dispersing in the air above the soil. In this way, there is a space between the soil and the polymer film in which the fumigant vapors are concentrated, thus reinforcing the efficacy of the product. Various types of films such as polyethylene films or films of SIF (semi-impermeable films), VIF (virtually impermeable films) or TIF (totally impermeable films) type are used during soil treatment by fumigation. Other types of films are also available with photocatalytic properties, for instance as described in U.S. Pat. No. 9,668,475 B2, which is herein incorporated by reference in its entirety for all purposes.

The polymer films are advantageously placed on the soil before or after treatment by fumigation, and left in place for the time necessary to allow effective control of nematodes, phytopathogenic fungi, weeds, harmful insects and other bacteria. After this treatment period, the duration of which greatly depends on the soil to be treated, on the climatic conditions, or on the type of crops, the polymer film can be removed or simply perforated in order to allow the planting of crops. A typical example of crops using this technique is strawberry crops.

Fumigation treatments were for a long time predominantly carried out by fumigation with methyl bromide (or compounds with similar activity). In the gaseous state, this compound exhibits excellent nematicidal, fungicidal, insecticidal and bactericidal properties.

Unfortunately, methyl bromide contributes to the depletion of the ozone layer and in accordance with the Montreal Accord (1992) is being phased out or completely banned. Methyl bromide is also highly toxic to humans.

The urgent need of replacement of methyl bromide with substitutes which are equally effective and which are environmentally friendly is challenging. Among others, products based on sulfur compounds such as dimethyl disulphide, which has both excellent efficacy and excellent environmental profiles, have been used. An example of such a product was successfully introduced by Arkema and described in US Patent Publication No. 2004/0087665 A1, which is herein incorporated by reference in its entirety for all purposes.

Many, if not most, of the pesticides currently used for soil disinfection in conventional farming are prohibited in organic farming. Steam sterilization is the main method for sterilization of the soil in organic farming. It is mainly used in greenhouses.

When discussing steam sterilization techniques, one should distinguish between deep and shallow steam sterilization. In deep steam sterilization, the hot steam penetrates to a depth of more than 10 cm and up to 70 cm. Deep sterilization is effective in combatting severe pests and diseases. In shallow steam sterilization, the hot steam penetrates the soil to a maximum depth of only 10 cm. Shallow steam sterilization has a short-term effect only, and soil life regenerates a few days after treatment. It is mainly effective against weeds and is considered a thermal weed treatment.

The main argument in favor of steam sterilization is that as a physical method, it is permitted in organic farming. Further, steam sterilization leaves no residues in the soils or in the crops. The main drawback of deep steam sterilization is that it uses a great deal of energy. While shallow steam sterilization uses less energy than deep steam sterilization, its effects on soil life are only transitory.

While several chemical alternatives exist, steam treatment has been suggested as a non-chemical option for pre-planting soil disinfestation. The steam application methods include steam blanket, spike-hose, buried drip irrigation lines, or drain tile. J. James, *Soil science*, January 1946, vol. 61, issue 1, p. 83-92; Rainbolt, et al., *Hort. Technology* April 2013, vol. 23, no. 2, 207-214. Several patents and patent applications describe various techniques, equipment and processes to treat soil based on steam. These include: CN 204951688 U; CN 106668890 A; KR 20130045467 A; JP H-11220959 A2; CN 108377818 A; KR 100958847 B1; KR 200239688 Y; WO 2018/073718 A1; GB 1234512. Soil steam sterilization (also called "soil steaming") is an agricultural technique that sterilizes soil with steam in open fields, nurseries and/or greenhouses. Pests of plant cultures such as weeds, bacteria, fungi, nematodes and viruses are killed through application of hot steam. Today, the application of steam is considered one of the best and most effective way to organically disinfect sick soil, potting soil and compost. Several methods for surface steaming are in use. The main ones are sheet steaming, the steaming hood, the steaming harrow, the steaming plough and vacuum steaming with drainage pipes, mobile pipe systems or during soil spading.

Selection of the most suitable steaming method is based on factors such as soil structure, which plants will be cultivated and the general condition of the soil to be treated. At present, more advanced methods are being developed, such as sandwich steaming in order to minimize energy and cost as much as possible. The main challenges to widespread adoption of steam technology for large scale production include fuel consumption and time needed for the application. Cost is indeed the current challenge that limits the adoption of steam treatment to large-scale field production. Cost includes fuel consumption (to generate the steam), labor and application time. Studies have shown that most plant pathogens, insects and weeds will die when moist soil is heated to temperatures of 65° C. or greater and then maintained at that temperature for at least 30 minutes. Samtani, et al., *Crop Protection*, Volume 30, Issue 1, January 2011, 45-51. Samtani et al., *HORTSCIENCE* 47 (1):64-70, 2012.

S. Fennimore et al., did a study on energy and cost estimation in an application of steam in strawberry fields. The results showed that the fuel consumption was 14,600 liters of fuel/hectare which converts to $1.55 \times 10^{-5}$ BTU/m$^3$ of soil. Machine, fuel, and labor cost were estimated at US $13,521 per hectare based on a single bed prototype in December 2011. In addition, the time needed to achieve the target temperature at the required bed depth led to an average applicator speed of 161 meter/hour or 47 hours to steam treat a single hectare, a speed too slow to commercialize as a result of the need for timely field treatment. S. Fennimore, et al., *Hort. Science* 49 (12):1542-1549, 2014.

Obviously, these factors affect the economic viability of the technology for growers. While fuel cost are exceedingly high, the overall cost is not so remote from the current methyl bromide/chloropicrin application cost of $8,000-$8,500/hectare depending on the crop. Samtani, et al., *HORTSCIENCE* 47 (1):64-70, 2012 and Sydorovych, et al., *HortTechnology*, 18 (4): 705-713, October-December 2008.

The use of hydrogen peroxide (or other suitable peroxide compounds) as a soil disinfectant is described in U.S. Provisional Patent Application No. 62/636,866, the entire disclosure of which is incorporated herein by reference for all purposes. Hydrogen peroxide has the great advantage of leaving no residues and is environmentally benign to the soil. Notably, none of the foregoing references disclose that heat (e.g. applied as steam or hot air or peroxide solution heated above its boiling point, or resistive heating) and peroxide can be used in conjunction to improve soil disinfection and/or remediation over either used alone for such purposes.

The present invention relates, in certain embodiments, to the combination of hydrogen peroxide (or other source of peroxide) and heat, to increase the speed of disinfection and increase efficacy. The heat is preferably applied as steam or could be applied by other means such as hot air or resistive heating. If the source of peroxide is supplied as an aqueous solution, the combined heat and peroxide can alternatively be applied as a peroxide solution heated above its boiling point. The synergy between the methods creates a means of improving sterilization and disinfection efficacy that cannot be obtained by the compounds/methods used independently. The increased speed and efficacy lead to a reduction in energy consumption and labor time that would translate in a reduction in total cost per treated hectare and would thus compete in total cost with the traditional chemical fumigants options, while being more environmentally friendly. Furthermore, this technique can be used to remediate soil that has been contaminated with undesirable chemicals. The peroxide compound together with the heat, especially as steam, can speed up the decomposition of certain organic and inorganic compounds to more volatile compounds, which then are volatilized by the application of heat.

Hydrogen peroxide or other source of peroxide can be added to the steam stream and vice-versa. If the peroxide is supplied as an aqueous solution, the peroxide solution itself can be heated to above its boiling point, thereby combining the application of heat with the peroxide. Based on the application, hydrogen peroxide or other suitable peroxide compounds can be injected in the steam in concentrations ranging from low to high (e.g., from 0.01 up to 70 weight percent). The ratio between the peroxide and the steam flow rate can be adjusted to afford the final workable concentration of peroxide or peroxide source injected in the soil. Accordingly, steam temperature and peroxide flow rate conditions can be adapted to the equipment, the method of incorporation, the type of soil and the selected crop planted or to be planted.

It should be noted and understood that steam is the most common method of applying heat to the soil. Heat can be applied to the soil in other ways such as dry heat, e.g., resistive heating, or hot air. If the peroxide source is supplied as an aqueous solution, the peroxide solution itself may be heated to above its boiling point and applied to the soil. Other heating methods include but are not limited to heating from renewable energy (solar, wind, biomass, methane from landfill, hydropower), electrical resistance heating, or thermal conductive heating. However, the various methods of heating can generally be considered to fall under the category of steaming since they usually depend upon converting the soil moisture into warm water or steam needed for the disinfection process. Accordingly, it should be understood that the injection of peroxide under hot conditions would be considered a steam/peroxide process as long as there is a combination of heat and a peroxide, regardless of the heat source.

Hydrogen peroxide or other peroxide compounds such as peracetic acid can be used to enhance the steam process. The present invention, in certain aspects, relates to the use of steam (or other source of heat) in the presence of a peroxide to disinfect soil.

A new method of soil disinfection based on steam used in conjunction with hydrogen peroxide and/or other peroxide compounds such as or a peroxide source, e.g. peracetic acid, sodium peroxide, potassium oxide, potassium peroxide, calcium peroxide, magnesium peroxide, urea peroxide, organic hydroperoxides (ROOH), organic peroxides (ROOR), and superoxides, wherein R is an alkane, alkene or alkyne, branched or unbranched, and of between 1 and 12 carbons or is an aromatic ring, usually of 6 carbons, or a combination of such rings, or other compounds that can produce reactive oxygen species, is disclosed herein for a similar disinfectant effect on soil treatment. This combined approach, of using peroxide and a heat treatment together, has the twin effects of increasing the efficacy of each treatment over each used alone, as well as to allow the speed of application to be increased. As noted above, these combined effects are expected to increase the economic advantage of this approach.

Peroxide compounds are relatively easy to access, store and transport and some are considered organic. One of the main advantages of hydrogen peroxide in particular is that it fully decomposes into oxygen and water upon reaction/decomposition and thus does not leave any residue in soil or in the crop. Hydrogen peroxide is a chemical compound with the formula $H_2O_2$. In its pure form, it is a colorless liquid, slightly more viscous than water. Hydrogen peroxide is the simplest peroxide (a compound with an oxygen-oxygen single bond). It is used as an oxidizer, bleaching agent and disinfectant in many applications. Its chemistry is dominated by the nature of its unstable peroxide bond.

Hydrogen peroxide is unstable and slowly decomposes in the presence of base, a catalyst or specific enzymes. Because of its instability, hydrogen peroxide is typically stored with a stabilizer in a weakly acidic solution. Hydrogen peroxide is found in biological systems including the human body. Enzymes that use or decompose hydrogen peroxide are classified as peroxidases.

Hydrogen peroxide is also known and considered as one of the best candidates for disinfection in organic crop production. The European Commission identified and reported the following substances: alcohol (ethanol), organic acids (acetic acid, citric acid), peroxides (hydrogen peroxide and peracetic acid) and ozone as the best organic basic disinfection toolbox products that could be used without restrictions to treat soil. European Commission, Directorate-General for Agriculture and Rural Development, Expert Group for Technical Advice on Organic Production—EGTOP, Final report on greenhouse production (protected cropping), Technical advice adopted at the 7th plenary meeting of 19 and 20 Jun. 2013.

Several articles and patent documents are related to the use of hydrogen peroxide in soil as a disinfectant or as a soil remediation method. However, all these articles are based on treatments limited to drench or spraying and only for very specific pathogens. None disclose the use of steam or heat used together with peroxide.

EP 0035800B1 relates to the use of an aqueous solution of hydrogen peroxide and/or aliphatic carboxylic peroxyacids having 1-4 carbon atoms in the carbon chain as a disinfectant for soil.

JP 57026607 discloses the use of soil drenching with hydrogen peroxide to control *Pseudomonas* and *Fusarium* on cut flowers. Treatment consisted of 1.6 $m^3$ of soil treated with 5 liters of 1:100 solution of 35% hydrogen peroxide. Carnation seedlings were planted in the treated soil the following week and resulted in fewer pathogens on the cut flowers. This type of treatment is not amenable to large scale field applications.

CN 106376336 discloses a method to control gray mold of *Chrysanthemum morifolium*. Treatment consisted of seedling treatment and soil treatment. Soil disinfection was done by spraying directly on the soil followed by deep tillage, spraying of anhydride lime, harrowing, mulching with a film and sealing for 6-8 days. Seedlings grown in the soil with regular fungicide treatment, heat treatment (cooling and heating) and growth management showed less gray mold. While the incidence of gray mold was reduced to 2-3%, this type of growth management is very labor intensive and not applicable in open fields where seedlings/plants are not moveable.

CN 102701881 describes the use of a combination of hydrogen peroxide and a catalyst solution. A first liquid solution contains a hydrogen peroxide decomposition catalyst (Fe, Zn, K, Mn, Cu, K—Mn chelated with EDTA, diethylenetriamine pentaacetic acid, ethylenediamine dihydroxyphenylacetic acid, and/or hydroxyethylethylenediamine triacetic acid) and a second liquid solution comprises hydrogen peroxide. The catalyst solution is added first until penetration and then is added the hydrogen peroxide solution. This two-step method is said to kill bacteria, insect eggs, promote the degradation of pesticides and provide trace elements. Using a two-step process is obviously burdensome as the catalyst solution has to be mixed with the soil first before the peroxide solution can be incorporated. Time and cost would make this process incompatible with the current fast paced modern agrochemical practices.

CN 101716358 describes the addition of a combination of soil disinfection agents which can lead to soil disinfection. The treatments consists of soaking the soil in water, and adding the disinfectant agent such that the final concentration is 10-200 mg/L. The disinfection agent contains one or more of 60% sodium dichloro isocyanurate, 60% sodium tricloro isocyanurate, 10% peracetic acid, 30% sodium hypochlorite and 2% $ClO_2$, potassium permanganate or hydrogen peroxide. While these bleach products have a well-documented efficacy as disinfectant, they would not be considered environmentally friendly for use in soil and could not be used in organic production and agriculture.

JP 2008 272530 discloses the use of $H_2O_2$ aqueous solution and $MnO_2$ (as catalyst) to increase $O_2$ concentration in the soil during the disinfection process by ozone via an injection well. The use of ozone, which is a well-known disinfectant, is regarded as highly toxic and not easily used in open fields and is therefore difficult to use on a large scale.

Soil drenching with hydrogen peroxide was studied in the disinfection of soil used for strawberry cultivation (Rev. Fitotec. Mex. Vol. 37 (4): 393-398, 2014). This laboratory study was done by drenching soil (from a strawberry field) in pots. Efficacy of hydrogen peroxide and peracetic acid was found to be good and at least to reduce frequency of various pathogens. This experimental approach in a laboratory setting does not address the difficulty of using such a disinfectant in an open field and how to get efficacy on a larger scale using farmer's equipment.

In some cases, the naturally occurring iron minerals, goethite and magnetite were used to catalyze hydrogen peroxide and initiate Fenton-like reaction of silica sand contaminated with diesel and/or kerosene in batch system as described in Chemosphere, vol.37, No. 8, pp. 1473-1482, 1998. This type of application is used to decontaminate soil from chemical pollution and is not related to the removal of pathogens with the intent to grow plants.

The rate of enzymatic decomposition of hydrogen peroxide was studied and presented in Biologicheskii Zhurnal Armenii, vol. 36, Issue 4, pp. 291-4, Journal, 1983. This type of study on catalytic decomposition of hydrogen peroxide further confirms that hydrogen peroxide will not leave any residue in soil or crops planted in treated soil.

The catalase activity and survival of a particular organism, Pseudomonas putida, a root colonizer, upon treatment with peracetic acid in a laboratory setting is described in Can. J. Microbiol. 47: 222-228 (2001).

Commercial products to treat soil to kill pathogens are available. For example TerraStart® or TerraClean® from BioSafe Systems LLC are formulated with hydrogen peroxide and peracetic acid. These products are labeled for pre-plant soil treatment for control/suppression of soil borne plant pathogens/diseases in field grown crops. TerraStart® is applied by drench/chemigation, as an application through drip irrigation systems or through sprinkler irrigation systems. TerraClean® is applied through soil drench, flood irrigation or drip irrigation. These products cannot be used in situations where the product is to be injected in the soil and the treatment is therefore limited to the upper surface of the soil.

Another company, Chemtex Speciality Limited, uses silver ion in combination with hydrogen peroxide in order to enhance the activity of the peroxide (such product is marketed under the name "Alstasan Silvox"). The process stabilizes the hydrogen peroxide with the addition of silver, so that the presence of antimicrobial silver nitrate can be seen as a "stabilizer and activator" at the same time. $AgH_2O_2$ as a result of $H_2O_2 + AgNO_3$ is claimed to be safe for both humans and the environment. Silver stabilized hydrogen peroxide is used as a disinfectant because of its antiviral, antifungal, and antibacterial abilities. There are no indications that this product may be used as a soil disinfectant. The use of silver is only considered as a disinfectant on hard surfaces (healthcare cleaning for example) as the presence of silver is not authorized for products to be used on crops.

Another study focused on the combined effect of steam and the exothermic decomposition of KOH applied to tomatoes to combat certain pests. The authors concluded that the combination was effective against *Fusarium oxysporum* f. sp. *lycopersici* and *Sclerotium rolfsii*, but had no significant effects on total fungus and actinomycete density. Luvisi, et al., *Adv. Hort. Sci.*, 2008 22 (3): 174-181.

As discussed above, while some information regarding the effect of hydrogen peroxide on soil is described in the literature in laboratory settings, mostly using spraying or drenching methods, there is no prior art of actual field tests of the efficacy or the method of applying peroxides with conventional large-scale "fumigation/disinfection" equipment. Furthermore there is no discussion or disclosure of using steam or heat together with peroxide to effect soil sterilization.

The combination of steam and peroxide is likewise useful for soil remediation, i.e., the removal and/or decomposition of harmful chemicals from soil. The above discussion regarding agricultural applications is equally suitable for soil remediation of the upper layers of the soil. In addition, the combination of steam and peroxide can be injected more deeply into the ground to effect the remediation of sub-surface soil.

Innovative technologies for sub-surface remediation, especially heating of subsurface to enhance recovery of organic contaminants, are increasingly being evaluated. Davis, *Steam Injection for Soil and Aquifer Remediation, Ground water issue*, EPA/540/S-97/505, January 1998.

Thermal remediation is the technology that makes use of steam injection and possibly electrical resistance heating. The energy that is injected into the subsurface mobilizes volatile and semi-volatile organic contaminants so that they are easy to remove. Then contaminants, groundwater, and vapors are pumped out and treated or sent off site for disposal. This technology uses steam and hot air to strip volatile organics from contaminated soil. The treatment equipment is mobile and treats the soil in-situ without need for soil excavation or transportation. The organic contaminants volatilized from the soil are condensed and collected by the process treatment train, resulting in a small volume of concentrated organic liquid waste for transportation, disposal, or recycle. *In-Situ Steam/Hot-Air Soil Stripping, Demonstration Bulletin*, EPA/540/M5-90/003, February 1990. Steam injection was initially developed by the petroleum industry for the enhanced recovery of oils from reservoirs. Since that time, laboratory studies and field demonstrations have demonstrated the ability of steam injection to also effectively recover volatile and semi-volatile contaminants from the subsurface. This is considered a green practice intended to remediate superfund and similar areas. *Green Remediation Best Management Practices: Implementing In Situ Thermal Technologies*, Office of Superfund Remediation and Technology Innovation, EPA 542-F-12-029, October 2012.

It is known that hydrogen peroxide by itself can help the remediation of various contaminating chemicals from the ground. Carsten et al., *Journal of Contaminant Hydrology*: 68 121-141, 2004; Watts, et al., *Journal of Hazardous Materials* B69, 229-243, 1999; Watts, et al., *J. Environ. Eng.*: 131 (4): 612-622, 2005.

A peroxide is a compound that contains an oxygen-oxygen single bond or a peroxide anion. The simplest and most stable of the peroxides is hydrogen peroxide, or $H_2O_2$; a readily available oxidizer that is used for a variety of industrial processes. Hydrogen peroxide in its pure form is colorless and odorless, but is generally supplied in diluted form for safety purposes. When used as a remediation agent, hydrogen peroxide naturally decomposes into oxygen and water, raising the oxygen levels in the soil. The elevated oxygen encourages aerobic bacteria to become active and consume organic contaminants, breaking them down into less harmful compounds. This effect is especially pronounced in deeper layers of soil, particularly since the steam or heat would not warm the soil enough to kill such microbes, but instead increase their activity, unlike the higher temperatures that can be attained in the upper layers of the soil.

Catalyzed hydrogen peroxides are a combination of hydrogen peroxide and a catalyst, generally ferrous iron, which work together to generate hydroxyl free radicals, which are among the strongest oxidants that can be used in water. These free radicals then actively oxidize organic compounds into stable inorganic compounds, including carbon dioxide, oxygen, and salts. The chemical reactions that take place with catalyzed hydrogen peroxides can be complex, but they are extremely effective at neutralizing organic compounds. As regulations for clean water have increased, the use of peroxides for remediation projects has become more widespread.

At a remediation site, peroxides are introduced into the soil through infiltration galleries or injection wells, with depths depending on the depth of contamination. Injection wells are also used to monitor the concentration of contaminants and track the performance of the remediation process.

When hydrogen peroxide is used without a catalyst, it is generally delivered into injection wells or monitoring wells via a gravity feed at regular time intervals. In catalyzed hydrogen peroxides applications, an injection unit is often used to deliver the catalyzed peroxide under pressure as a continuous feed to the injection points in the plume. "*Using Peroxides for Remediation*", Seidler Chemical Co, Inc., http://www.seidlerchem.com/using-peroxides-for-remediation.htm.

While each of peroxide and steam alone have been disclosed to remediate soil or to sterilize soil for agricultural purposes, there has been no appreciation until now that used together, peroxide and steam/heat can improve the speed and completeness of soil remediation or sterilization over either used alone for such purposes.

Therefore, disclosed herein is a new type of treatment of soil pathogens, i.e. pathogens, harmful bacteria, fungi, nematodes, and other pests, as well as killing weeds and weed seeds, which can be used by the farming community. The treatment utilizes hydrogen peroxide and/or other peroxide compounds such as peracetic acid or other peroxides as described herein, together with the application of heat, preferably as steam. The method is easy to implement, is safe and cost effective, and is without the deficiencies of the various methods presented above. Further, using a combination of steam and peroxide or a source of peroxide has not been used or suggested until now for soil/subsurface remediation. This invention proposes to combine the use of peroxide with the use of steam (or heat) to enhance the remediation process as well as for the treatment of soil contaminants, i.e. harmful chemicals. The combination of steam plus peroxide or hydrogen peroxide can be introduced into the soil through infiltration galleries or injection wells or via a soil cultivation technique. It is understood that using hydrogen peroxide does not modify the recovery process of a steam remediation process. However, the addition of hydrogen peroxide will considerably enhance and initiate the in-situ remediation by reacting with the largest bio-contaminants present in subsurface soil, in addition to increasing the amount of available oxygen. The subsurface mobilized volatile and semi-volatile organic residual contaminants can then be easily removed.

SUMMARY OF THE INVENTION

The present invention, according to certain aspects, provides a new method of soil disinfection and soil remediation that combines heat, preferably as steam applied to soil, together with a peroxide or a peroxide source. Further, if the peroxide or the peroxide source is an aqueous solution, it may itself be heated above its boiling point to provide a hot vapor, such that the treatment is done with the hot vaporized peroxide solution. Non-limiting examples of peroxide compounds or sources of peroxides include, hydrogen peroxide, peracetic acid, sodium peroxide, potassium oxide, potassium peroxide, calcium peroxide, magnesium peroxide, urea peroxide, organic hydroperoxides (ROOH), organic peroxides (ROOR), and superoxides, wherein R is an alkane, alkene or alkyne, branched or unbranched, and of between 1 and 12 carbons or an aromatic ring, usually of 6 carbons, or a combination of such rings, or other compounds that can produce reactive oxygen species. These compounds are relatively easy to access, store and transport. Steam or the hot vaporized peroxide solution can conveniently be generated on-site or on or in the equipment used to apply the combination of peroxide and steam to the soil being treated for pests or being remediated.

Further, special application techniques described herein allow the use of common soil disinfectant equipment as is now used in the farming industry to apply these materials safely and with greater efficacy than has heretofore been possible. Methods of the use of hydrogen peroxide or these other peroxide compounds capable of producing reactive oxygen species to treat soils or plant substrates, in particular those intended for agriculture for controlling nematodes, pathogenic fungi, insect pests and bacteria are described herein.

Field equipment combining spading machines with injection or spreading of the active ingredient and the steam do a much better job of mixing the peroxide compound and the steam more deeply into the soil than a plain drench or direct spray on the soil surface.

In addition, the optional step of covering the soil with a plastic film further enhances efficacy by keeping the active ingredient in close proximity to the treated area, and prevents dissipation and evaporation of the peroxide. Applying such a film also contributes to the efficacy of the steam/heat treatment by helping hold heat in the soil to prolong the sterilization effect of the heat.

Regarding soil remediation techniques, those currently in use that utilize peroxide or steam can be adapted to the use of steam together with peroxide or the peroxide solution heated to above its boiling point to provide a hot vapor to effectively deliver the steam and peroxide to the subsurface soil to effect soil remediation and decontamination. Non-limiting examples include the use of injection wells, either conventional or recirculating.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Various non-limiting aspects of the invention may be summarized as follows:

Aspect 1: A method to treat soil, the method comprising a step of: a) applying a peroxide-based treatment and, optionally, a source of heat, to the soil, wherein the peroxide-based treatment comprises a source of peroxide and wherein the soil has an initial temperature; wherein the application results in either or both of i) the peroxide-based treatment being mixed into the soil and ii) the temperature of the soil being raised above the initial temperature.

Aspect 2: The method according to aspect 1, wherein the method comprises a second step b) concurrently with or within a time period of application of the peroxide-based treatment, of cultivating the soil, wherein the soil that is cultivated is at least 15 cm deep.

Aspect 3: The method according to aspect 1 or aspect 2, wherein the peroxide-based treatment comprises an aqueous treatment solution and the aqueous treatment solution comprises the source of peroxide dissolved in water.

Aspect 4: The method according to any of aspects 1-3, wherein a source of heat is applied to the soil.

Aspect 5: The method according to aspect 4, wherein the source of heat comprises steam.

Aspect 6: The method according to any of aspects 1, 2, 4, or 5 wherein the peroxide-based treatment comprises a granular solid.

Aspect 7: The method according to aspect 6, wherein the granular solid is applied to the soil by a rotary spreader or a drop spreader.

Aspect 8: The method according to any of aspects 3-5, wherein at least one of the aqueous treatment solution or the steam is applied to the soil by at least one shank, and wherein the shank comprises at least one opening on a back side of the shank whereby the aqueous treatment solution and/or the steam are delivered to the soil.

Aspect 9: The method according to aspect 8, wherein the shank further comprises at least one wedge placed on the opposite side of the shank from the at least one opening, such that each opening on the shank has an associated wedge.

Aspect 10: The method according to aspect 8 or aspect 9, wherein at least one of the aqueous treatment solution or the steam is supplied to the at least one shank from separate pressurized tanks.

Aspect 11: The method according to any of aspects 3-5 or 8-10, wherein the aqueous treatment solution is applied to the soil at a rate of between 100 liters per hectare and 6000 liters per hectare.

Aspect 12: The method according to any of aspects 3-5 or 8-11, wherein the method further comprises a step of diluting a peroxide-based concentrate with water to produce the aqueous treatment solution, wherein the dilution step occurs within 8 hours prior to step a).

Aspect 13: The method according to any of aspects 3-5 or 8-12, wherein the aqueous treatment solution comprises at least 0.1% by weight of the source of peroxide.

Aspect 14: The method according to any of aspects 3-5 or 8-13, wherein the aqueous treatment solution comprises at least 1% by weight of the source of peroxide.

15: The method according to any of aspects 1-14, wherein the source of peroxide is selected from the group consisting of hydrogen peroxide, perborates, percarbonates, organic peroxides, persulfate salts, peroxyacids, peroxyesters, peroxyketals and mixtures thereof.

Aspect 16: The method according to any of aspects 1-14, wherein the source of peroxide comprises hydrogen peroxide.

Aspect 17: The method according to any of aspects 1-14, wherein the source of peroxide comprises peracetic acid.

Aspect 18: The method according to any of aspects 3-5 or 8-17, wherein the aqueous treatment solution further comprises a surfactant or a wetting agent.

Aspect 19: The method according to aspect 18, wherein the wetting agent or surfactant is selected from the group consisting of alcohols, non-ionic surfactants, dimeric surfactants, biosurfactants, phosphate esters, and mixtures thereof.

Aspect 20: The method according to aspect 18 or aspect 19, wherein the surfactant or wetting agent is present in the aqueous treatment solution at a level of at least 0.01 percent by weight.

Aspect 21: The method according to any of aspects 2-20, wherein the soil that is cultivated is at least 20 cm deep.

Aspect 22: The method according to any of aspects 2-21, wherein the soil that is cultivated is at least 50 cm deep.

Aspect 23: The method according to any of aspects 2-22, further comprising, after step b), a step c) wherein the soil surface is leveled and consolidated by a rotating harrow and a step d) wherein the soil is compacted by a power driven roller after the peroxide-based treatment is applied and mixed into the soil.

Aspect 24: The method according to any of aspects 2-23, wherein the method further comprises, after step b), a step of sieving the cultivated soil.

Aspect 25: The method according to any of aspects 1-24, wherein the method further comprises, as a final step, a step of applying a layer of polymer film on top of the soil.

Aspect 26: The method according to aspect 1 wherein step a) is done using a well and the peroxide-based treatment comprises an aqueous treatment solution and the aqueous treatment solution comprises the source of peroxide dissolved in water.

Aspect 27: The method according to aspect 26, wherein the well is a vertical well.

Aspect 28: The method according to aspect 26, wherein the well is a horizontal well.

Aspect 29: The method according to any of aspects 26-28, wherein the aqueous treatment solution is applied using pressure.

Aspect 30: The method according to any of aspects 26-29, wherein the aqueous treatment solution is applied as a hot vaporized solution.

Aspect 31: The method according to aspect 30, wherein the hot vaporized solution is applied using pressure.

Aspect 32: The method according to any of aspects 26-29, wherein a source of heat is applied and the source of heat is steam.

Aspect 33: The method according to aspect 32, wherein the steam is applied using pressure.

Aspect 34: The method according to aspect 1, wherein step a) is done using an injection gallery and the peroxide-based treatment comprises an aqueous treatment solution and the aqueous treatment solution comprises the source of peroxide dissolved in water.

Aspect 35: The method according to aspect 34, wherein a source of heat is applied and the source of heat is steam.

Aspect 36: The method according to any of aspects 26-35, wherein the method further comprises a step of diluting a peroxide-based concentrate with water to produce the aqueous treatment solution, wherein the dilution step occurs within 8 hours prior to step a).

Aspect 37: The method according to any steps 26-36, wherein the aqueous treatment solution comprises at least 0.1% by weight of the source of peroxide.

Aspect 38: The method according to any of aspects 26-37, wherein the source of peroxide is selected from the group consisting of hydrogen peroxide, perborates, percarbonates, organic peroxides, persulfate salts, peroxyacids, peroxyesters, peroxyketals and mixtures thereof.

Aspect 39: The method according to any of aspects 26-38, wherein the source of peroxide comprises hydrogen peroxide.

40: The method according to any of aspects 26-39, wherein the source of peroxide comprises peracetic acid.

Aspect 41: The method according any of aspects 26-40, wherein the source of peroxide further comprises a catalyst for promoting the decomposition of the peroxide.

Aspect 42: The method according to aspect 41 wherein the catalyst is selected from the group consisting of a source of iron (II), a source of iron (III) and mixtures thereof.

Aspect 43: The method according to any of aspects 1-42, whereby a combined remediation, killing of arthropod eggs, nematocidal, fungicidal, insecticidal, and bactericidal effect is achieved.

DETAILED DESCRIPTION OF THE INVENTION

The invention relates, in certain embodiments, to a process which comprises applying a peroxide or peroxide-based disinfectant or remediation agent or a solution of a peroxide source along with optional heat, usually steam, to soil or a plot of land to be treated. The invention is also related to a process which comprises applying an aqueous peroxide solution heated to above its boiling point to provide a hot vapor (i.e., a vaporized solution), thereby providing the combination of heat and peroxide. The disinfectant/remediation agent and steam application, or hot vaporized disinfectant/remediation agent is done using soil injection for liquids or gasses. In addition, spreading equipment for granular solids that comprise a source of peroxide can be used with combination with injection equipment for the steam. Any of these techniques can be used with cultivation equipment that can mix and break up the soil in order to increase the contact between the peroxide and steam and the soil or substrate to be treated. Further, the mixing technique ensures that the peroxide-containing solution or solid or as well as the steam or hot vaporized peroxide solution are intimately mixed with the soil before the peroxide starts to decompose, thus ensuring maximum efficacy of the disinfectant or remediation agent at relatively low concentrations of peroxide. The invention also relates to the solution or granular solid or hot vaporized peroxide solution (i.e. aqueous peroxide solution heated above its boiling point) that is applied to the soil or plot to be planted.

As used herein, a disinfectant is defined as a substance that can temporarily or permanently disable, immobilize, or kill any or all or some of fungi, bacteria, insects, or nematodes that are harmful to agricultural plants. While it is understood that the term "fumigant" typically refers to a substance that diffuses through the soil in the gaseous state, as used herein it is to be understood to also mean a liquid that can soak soil or a granular solid that can be mixed in to soil and effect disinfection thereof.

The term treat, as used herein, means the application of peroxide and/or steam to either or both disinfect or remediate or decontaminate soil Likewise, the term "treatment" or "treatment agent" refers to the peroxide or source of peroxide and/or the steam that is applied or the hot vaporized peroxide solution that are applied to the soil as either or both of a disinfectant or a remediation agent.

The term remediate, as used herein, means to either or both of decompose or volatilize at least some undesirable compounds in soil.

The term undesirable compound, as used herein, refers to organic or inorganic chemicals that could contaminate groundwater or be hazardous to plants or animals. Non-limiting examples of such undesirable compounds or contaminants include petroleum products, gasoline, diesel, kerosene, halogenated hydrocarbons of which tetrachloroethylene (PCE) or trichloroethylene (TCE) are non-limiting examples, aromatics such as benzene, toluene, xylenes, and derivatives thereof (BTX), phenol and derivatives, polycyclic aromatics (PAH) such as naphthalene and derivatives, volatile organic compounds (VOC), non-volatile organic compounds, halogenated solvents such as 1,1,1-trichloroethane, dense non-aqueous phase liquids, light non-aqueous liquids, organophosphorous compounds, organosulfur compounds, etc.

The term decontaminate, as used herein, means reducing the amount of either of both of undesirable chemical compounds as listed above, or fungi, bacteria, insects, or nematodes that are harmful to agricultural plants, and/or are harmful to animals.

The term cultivate, as used herein, means to stir up the top layer of soil, such that deeper layers of soil are brought to the surface, and the entirety of the top layer of soil is broken in smaller agglomerates if necessary and mixed, such that the deeper layers and upper layers are mixed together.

The term vaporized peroxide or vaporized peroxide solution or hot vaporized peroxide solution as used herein all refer to an aqueous solution of a source of peroxide, such as hydrogen peroxide that has been heated to above its boiling point and therefore comprises a hot vapor of peroxide and water that can be applied to soil as described herein.

Peroxide-Based Soil Disinfectant or Fumigant

Any peroxide compound is suitable for the practice of the invention. Suitable compounds include hydrogen peroxide and peracetic acid and mixtures thereof. The source of peroxide compound for the aqueous disinfectant solution may be, for example, a relatively concentrated solution of hydrogen peroxide in water or a relatively concentrated solution of peracetic acid also containing acetic acid, water and hydrogen peroxide. Also suitable are: perborates, percarbonates, organic peroxides, organic hydroperoxides, persulfate salts, peroxyacids, peroxyesters, peroxyketals and mixtures thereof.

The peroxide can be, at 25° C., in the form of a liquid (e.g., hydrogen peroxide, peracetic acid), a liquid solution, or in the form of a solid (e.g., sodium percarbonate, hydrogen peroxide-urea also called carbamide peroxide) and can be advantageously used to introduce reactive oxygen species compound in the soil and treat against nematodes and soilborne pathogens. The peroxide can also be in the form of a gas, such as a hot vaporized aqueous solution of a peroxide or peroxide source.

The phrase "reactive oxygen species" (abbreviated herein as "ROS") describes oxygenated compounds which serve as a source of oxygenated radicals. The term is considered to be synonymous with "activated oxygen species." These compounds include, inter alia, peracetic acid, sodium peroxide, potassium oxide, potassium peroxide, calcium peroxide, magnesium peroxide, urea peroxide, hydrogen peroxide ($H_2O_2$), organic hydroperoxides (ROOH), organic peroxides (ROOR), and superoxides, where R is an alkane, alkene or alkyne, branched or unbranched, and of between 1 and 12 carbons or an aromatic ring, preferably having 6 carbons. As used herein, the term "reactive oxygen species" excludes the gas ozone.

As discussed below, liquids and steam are injected into upper layers of the soil with typical equipment that can be used for agricultural purposes. As discussed in more detail below, shanks can be used for liquid or gas or hot vapor injection into these upper soil layer, while solids are mixed in to the upper layers of soil with a spreader or broadcast equipment. Both types of equipment are attached to the rotating spader equipment as an add-on. The solid granules and/or liquid and/or gas should be mixed in the soil as intimately as possible.

Also discussed below, in order to remediate/decontaminate deeper layers of soil, below the level that is typically cultivated for agriculture, (generally deeper than 135 cm) wells, tranches and galleries are used to apply the steam and peroxide or the hot vaporized peroxide solution.

Equipment for Applying Peroxide and Optional Steam to Upper Layers of Soil

The upper layer of soil is understood to mean the depth that is typically cultivated during the practice of agriculture. This is understood herein to be a maximum depth of approximately 135 cm. Any equipment capable of injecting or spreading or otherwise applying the peroxide-based soil treatment and, optionally, steam or other source of heat, such as hot air or hot vaporized peroxide solution while simultaneously or immediately after the application of the peroxide and optional steam, cultivating the soil and stirring the peroxide-based soil treatment and optional steam into the soil to be treated is suitable for the practice of the invention. The equipment can optionally be capable of smoothing and compacting the soil after the cultivation/application of the peroxide-based soil treatment and optional steam. Advantageously, the equipment is of the type known as a rotating spading machine that is equipped with injectors or shanks or injector-shanks or is equipped with a granular applicator or spreader for applying the peroxide-based soil treatment and optional steam, whether the peroxide-based soil treatment is supplied as a liquid or as a granular solid or as a hot vaporized aqueous peroxide solution.

In addition, an optional smoothing step and then an optional compaction step can be done immediately after the spading and injection/application/cultivation step. This is most usually done in a single operation with the use of a power driven harrow behind the spading/injection or spading/spreading/broadcasting step that smooths the freshly cultivated and treated soil. Preferably a power-driven smooth roller is behind the harrow that serves to compress the freshly spaded/treated/smoothed soil.

The advantages of a spading machine equipped in this manner is that it is one of the few pieces of equipment to successfully incorporate fumigants (i.e., broad-spectrum pesticide that moves through the soil as a gas) and non-fumigants (i.e., pesticide that is formulated as a liquid or solid and is moved through the soil with water), nematocides and/or insecticides evenly through the total depth of the tillage layer. Incorporating these compounds with spring tine cultivators or even with rotary cultivators results only in mixing them in the top 5 to 6 cm, which is in most cases insufficient to control nematodes and soil-borne insects.

Because spading always brings fresh moist soil from the deeper layers of soil to the surface, the compaction and "sealing" of the soil is much easier than with the shank injector used alone, resulting in a higher disinfection agent concentration and more intimate contact with the heat of the steam in the top 15-25 cm of the tillage layer and hence a higher nematocidal effect. Importantly, spading contributes to much better nematode control, since the nematodes prefer the deeper layers of soil, but are brought to the surface and are placed in intimate contact with the peroxide-based disinfection agent and optional steam due to the ability of the spading operation to bring deeper layers of soil up to the surface and simultaneously mix them, thereby putting more nematocide in contact with the targeted nematodes. Furthermore, the rotating spading machine is a very efficient main soil tillage equipment.

The multiple advantages of the spader thus increase the efficacy of the peroxide and optional steam treatment by increasing the penetration, depth and mixing quality of the peroxide-based disinfectant product as well as the heat of the steam (if used) to the soil.

Using such equipment allows a complete mixing of hydrogen peroxide or other peroxide compounds and the optional steam or the hot vaporized aqueous peroxide solution into close and uniform contact with the soil, including the deeper layers that have been brought to the surface and therefore enhances efficacy of the active ingredient and the optional heat. Optionally, in a continuous operation, the soil surface is leveled and consolidated by the rotating harrow and "sealed" by a power driven roller after the peroxide-based solution or granular solid is applied and mixed into the soil. This optional immediate smoothing and then compacting of the soil behind the combined spading/application or injection/mixing step allows for the peroxide to efficiently and effectively disinfect the soil.

Shank-Injectors

In order to efficiently cultivate large open fields such as ones used for strawberry or vegetables, rotary spading machines (e.g., the equipment sold under the Imants or Forigo brands) are usually equipped with injectors or so-called shanks or shank-injectors to apply a fumigant/disinfectant (which can be liquid) to the soil while it is being cultivated by the spader. These spading machines generally also have a power-driven harrow behind the spading/injection step and a power-driven smooth roller behind the harrow that compresses the freshly spaded/pesticide treated/smoothed soil. The injectors are capable of injecting the fumigant or disinfectant liquid or steam into the soil as it is cultivated/spaded, usually at a depth of between 10 and 12.5 cm (half-way through the tillage layer). The disinfectant or remediation agent and optional hot steam are thus mixed throughout the tillage layer by the rotating spading blades.

For peroxide-based disinfectants or remediation agents that are supplied as liquids, wetting time should be no more than a few minutes. Wetting time is the time it takes to wet a defined amount of soil by the liquid. Accordingly, injection equipment should be engineered to have optimal distribution of the liquid and optional steam throughout the soil aggregates/particles. Multiple point injections will wet the soil faster than a single point injection since the liquid and steam (if used) will not need to diffuse as far through the soil. The critical pieces of equipment, besides the rotating spader, are the shanks (also called injectors, or shank-injectors) that inject the pesticidal peroxide-based disinfectant and, optionally, steam into the soil.

Shanks typically are comprised of knife-like blades that penetrate into the soil. The pesticide is supplied to the tip of the shank from a tank via a tube that runs down the back of the shank. The back of the shank is understood to refer to the side of the shank that is facing away from the direction of travel of the rotating spading machine as it is pulled by a tractor though the field to be cultivated. Shank injectors can be supplied from a pressurized tank, or be gravity-fed. As discussed above, shanks can have multiple openings spaced from the top to the bottom of the shank that will minimize the distance that the peroxide pesticide or hot vaporized peroxide solution or optional steam has to travel to be thoroughly incorporated into the soil. Further, shanks can incorporate wedge-shaped or other suitably shaped, projections on the front side, such that there is a spray nozzle behind each wedge to augment mixing and help break up the soil into aggregates. This type of shank or injector likewise can incorporate one opening with an associated wedge, or other projection on the bottom of the shank, or multiple openings, each with a wedge or projection, spaced from the top to the bottom of the shank.

Granular Applicators or Spreaders

Granular applicators are available for either band or broadcast applications if the peroxide compound to be used as a disinfection agent is supplied as a granular solid. These granular applicators may be operated as separate units but are preferably attached to other equipment such as rotary spading machine cultivating equipment to combine two or more operations, such that the soil is simultaneously disinfected or remediated and cultivated, as described above for liquid pesticides or remediation agent. These granular spreaders used to apply the granular form of peroxide or source of peroxide can be used in conjunction with the shank injectors described above to apply the steam, if steam is also to be applied. In this way, a granular form of peroxide can be applied to the soil along with steam. These granular applicators usually operate by gravity feed and have an adjustable opening to regulate the flow. Rotary and drop spreaders are two common types of granular applicators. Rotary spreaders distribute the granules to the front and sides of the spreader, usually by means of a spinning disk or fan. In a drop spreader, an adjustable sliding gate opens holes in the bottom of the hopper and the granules flow out by gravity feed. Drop spreaders are preferred over rotary spreaders when more precise placement of the pesticide or remediation agent is desired.

Spading Depth

Spading depth should be at least 15 centimeters in order to effectively disinfect the soil that will be planted. Spading depths can be 100 centimeters or 50 centimeters or 30 centimeters or 20 centimeters, since nematodes are known to survive at these depths in the soil. Spading can be, for example, as deep as up to 135 cm.

Treatment Depth for Soil Treatment using Cultivation Equipment:

The treatment depth in general corresponds to the spading depth, since the spading step serves to mix the peroxide-based disinfection formulation (liquid or granular solid) and also the steam (if used) or the hot vaporized aqueous peroxide solution into the soil. Typically, 15 cm to 20 cm is sufficient for soil treatment. Depths of 30 cm, 40 cm or 50 cm or even as deep as 135 cm are also contemplated as within the scope of the invention. Typically, if a liquid solution and/or optional steam or hot vaporized aqueous peroxide solution is applied, it is injected about halfway into the spading depth, but this can be varied, depending on the equipment, the particular soil and/or pests or contaminants that are being treated.

Soil Particle/Aggregate Size

If the peroxide-based disinfectant or remediation agent is supplied as a liquid, the soil to be treated needs to be wetted quickly, i.e., the peroxide solution (and also the steam, if used) should soak the ground rapidly and completely, in order for the peroxide-based disinfection solution to effectively disinfect the soil. Therefore, not only is the soil type (e.g., sandy, loam, clay, etc.) an important consideration, the spading/cultivation step should be capable of breaking the soil into soil particle/agglomerates such that these are no larger than 5 cm or preferably 3 cm, or preferentially 1 cm and more preferably ½ cm in size following the spading/cultivation step.

Likewise, if the peroxide-based disinfectant or soil remediation agent is supplied as a granular solid, the more the peroxide or optional heat are brought into intimate contact with the soil, the more effective the pesticide or remediation agent will be. Therefore the size of the soil particle/agglomerates is an important variable. Thus, the spading/cultivation step should be capable of breaking the soil into soil particle/agglomerates such that these are no larger than 5 cm or preferably 3 cm, or preferentially 1 cm and more preferably ½ cm in size following the spading/cultivation step that occurs while mixing the granular solid peroxide-based disinfectant or remediation agent into the soil.

Application Rate

In order to effectively disinfect and/or remediate the soil, the area to be treated needs to be effectively exposed to the steam (if steam is used) and wetted by the peroxide solution if the peroxide based treatment solution is supplied as a liquid. Generally, wetting a hectare (2.47 acres) with an aqueous solution uses approximately 1000 L to 2000 L, or 1000 L to 4000 L, or 1000 L to 6000 L. However, it is contemplated that depending on the concentration of the peroxide in the solution that is being employed as soil treatment, combined with the type of soil, that as little as 100 L/hectare of the peroxide based treatment solution) could provide effective disinfection and/or remediation. Likewise 200, 400, 600 or 800 L per hectare of the peroxide based treatment solution could provide effective pest control and/or destruction and removal of undesirable compounds and substances. If the optional heat, such as steam, or hot vaporized peroxide solution is used for the treatment, generally a target soil temperature and time of 65° C. for 30 minutes is expected to be effective. Lower temperatures and shorter times are suitable depending on the type of soil, type and amount of pathogens and or contaminants as well as the type and level peroxide treatment that are applied to the soil. The advantage of combining the peroxide treatment with the optional application of heat is that the soil treatment can be effective to lower the amount of contaminants and/or destroy pathogens in a shorter period of time and with the possibility of requiring lower levels of either or both of the target temperature/time at temperature and peroxide source.

The necessary amount of peroxide-based soil treatment solution and steam depends on the type of soil, the exact peroxide species and the level and type of infection or infestation of the soil, as well as the type and amount of undesirable compounds that are desired to be removed or destroyed by the application of the peroxide based treatment fluid and, optionally, steam. The same is true of the amount of steam or hot vaporized peroxide solution applied per hectare, if steam or hot vapor are utilized.

If the peroxide-based treatment solution applied to the soil as an aqueous solution, or as a hot vaporized aqueous solution, the concentration can vary from as little as 0.1% by weight of the source of peroxide to 0.5% or 1%, 5%, 10%, 20%, 30%, 40%, 50%, 60% or to as much as 70% by weight of the source of peroxide. The concentration of the peroxide depends greatly on the depth of the soil being treated, as well as the amount and type of contaminants that are to be destroyed or removed.

If the peroxide-based treatment is supplied as a granular material, the application rate likewise can vary considerably, depending on the exact condition of the soil, the needs of the crop to be planted and the exact compound that is used as the source of peroxide. Suitable application rates can range from 0.5 kg per hectare to 800 kg per hectare depending on the amount of active oxygen per molecule of the peroxide based treatment, the level and type of infestation and the type and level of undesirable compounds and the type of soil.

The granular peroxide compound can be simply mixed and allowed to decompose and produce reactive oxygen species that disinfect the soil. Alternatively, after applying or during the application of the granular peroxide compound, the soil can be irrigated to dissolve the granular solid peroxide and thereby effect disinfection and/or remediation of the soil.

The additional step of mulching, i.e., covering the top of the treated soil, with a plastic film is optionally possible, either with or without the optional smoothing and compaction steps.

Application Methods for Soil Remediation/Decontamination for Deep Soil Layers

It is to be understood that "deep soil layers" comprise the soil layers that are not typically cultivated by ordinary agricultural cultivation equipment. It should be understood herein that soil layers deeper than are typically cultivated during agricultural activities, are considered "deep". This is understood to be deeper than approximately 135 cm. Regarding the non-limiting examples of methods of applying the peroxide and steam treatment to the deeper layers of soil as described below, it should be understood that the exact parameters of selection and number of wells, trenches, galleries, etc. are determined by the type and amount of either or both of the chemical and/or biological contaminants that need to be destroyed and/or removed. Likewise the type of soil and depth of the contaminant are factors in determining the optimum application route for the peroxide based treatment with the optional application of heat. The heat, as described throughout can be applied for example as steam and/or hot vaporized peroxide solution or as hot air.

Injection Wells

Injection wells are understood to mean wells which are drilled into the soil into which the steam and peroxide or peroxide solution are injected to effect the treatment of the soil. They can be drilled to above the water table or below the water table. The size, depth, number and exact placement of such injection wells is known in the art and depends on factors such as location and amount of the contaminants, type and nature of contaminants, and type of soil. The steam and peroxide can be injected using pressure or simply using the force of gravity. These wells can be horizontal or vertical. A single well or a plurality of wells is suitable in the practice of this invention. Injection wells can be either emplacement or circulating. Emplacement wells are understood to be of the type where the peroxide and optional steam or hot air or hot vaporized peroxide are injected into the ground, but are not subsequently recovered from a recovery well.

Recovery Wells

Recovery wells are used in conjunction with injection wells and are understood to mean a well that is drilled at a distance of a meter or meters or fractions of a meter from the injection well. Such wells are intended to recover the water and peroxide solution that contains the removed undesirable compounds from above or below the water table. Likewise, the size, depth, number and exact placement of such recovery wells is known in the art and depends on factors such as location and amount of the contaminants, type and nature of contaminants, and type of soil Likewise, the contaminants and the water from the aqueous peroxide solution and steam can be removed from the recovery well by the use of vacuum, typically a vacuum bell placed over the opening, or the solution can be allowed to merely rise up and be pumped away. A single recovery well or a plurality of recovery wells can be used in the practice of this invention.

Infiltration Gallery

An infiltration gallery is a structure including perforated conduits in gravel to expedite transfer of water to or from a soil. These too are suitable for application of the peroxide based treatment solution and the steam to deeper layers of soil. The peroxide treatment can be applied using pressure, if it is supplied as a liquid. Likewise the steam can be supplied to the infiltration gallery under pressure or not.

Trenches

Trenches, of a geometry that is suitable to the particular circumstances can also be used to apply the peroxide based treatment and the steam to the deeper layers of soil to effect remediation/decontamination and/or disinfection.

Peroxide Stabilizers

Since peroxides generally are unstable, stabilizers may be needed to prevent premature decomposition of the concentrate, if it is used. Suitable stabilizers, can include but are not limited to stannates, polyols, diols, carboxylates, phosphates, pyrophosphates, ethylenediaminetetraacetic acid (EDTA) and salts thereof, amine-substituted organophosphonic acids and their salts, adipic acid and salts thereof, phosphoric acid and salts thereof, succinic acid and salts thereof, butylated hydroxytoluene (BHT), butylated hydroxyanisole (BHA), phenols, and mixtures thereof.

Peroxide Decomposition Catalysts

Conversely, if the source of peroxide is too stable, then the peroxide will take too long to decompose to the OH· radical which attacks and degrades the undesirable compounds to less hazardous substances. Suitable such catalysts include but are not limited to sources of iron(II) such as $FeSO_4$. Iron(III) sources are also suitable, such as iron(III) chloride. Non-limiting examples of catalysts can also include manganese dioxide.

The more difficult-to-oxidize pollutants may require the hydrogen peroxide to be activated with catalysts such as iron, copper, manganese, or other transition metal compounds. These catalysts may be used to speed up $H_2O_2$ reactions that may otherwise take hours or days to complete. $H_2O_2$ catalysis may occur either in solution (using soluble catalysts) or at the surface of solid catalysts.

The most commonly used solution catalyst is iron, which when used with $H_2O_2$ is referred to as Fenton's Reagent. The reaction requires a slightly acidic pH and results in the formation of highly reactive hydroxyl radicals (·OH) which are capable of degrading most organic pollutants. Another solution catalyst is copper, which is often used to destroy cyanides. Other metals also show catalytic activity with $H_2O_2$ and may be used to selectively destroy specific pollutants.

Various peroxidase enzymes and especially catalase can also act as catalyst for hydrogen peroxide. Among recently developed catalysts are iron-tetraamido macrocyclic ligand (TAML) activators. TAML have been designed and developed as a small-molecule that would mimic the peroxidase enzymes. Fe-TAML activators are highly active catalysts that function effectively at very low concentrations and are well-known for their ability to activate hydrogen peroxide to oxidize persistent pollutants in water. T. Collins, *Acc. Chem. Res.*, 2002, 35 (9), pp 782-790.

Formulation

If the peroxide-based disinfectant or remediation agent is applied as an aqueous solution (whether as a liquid or hot vaporized solution), dilution on-site to avoid pre-mixing the peroxide with additional water is recommended, although not strictly necessary. The working concentration (i.e. the amount of peroxide compound on a weight percent basis in the water) is contemplated to be between 0.1% and 5%, but can be much higher, particularly for deeper soil application. Therefore the peroxide-based treatment compound can be supplied as a peroxide concentrate that is mixed with water just prior to use. Suitable peroxide concentrations in the concentrate are between 35% and 70% by weight. Such high levels, up to 70% by weight may also be used for the deeper soil levels. If the peroxide-based treatment solution is applied to the soil as an aqueous solution or hot vapor, the concentration can vary from as little as 0.1% by weight of the source of peroxide to 0.5% or 1%, 5%, 10%, 20%, 30%, 40%, 50%, 60% or to as much as 70% by weight of the source of peroxide. The concentration of the peroxide depends greatly on the depth of the soil being treated, as well as the amount and type of contaminants and/or pests that are to be destroyed or removed.

At a typical working dilution (around 1%), peroxide treatment solution will quickly become unstable if not used within a few hours following mixing especially with dirty water (the organic material will react with the peroxide).

Unless the water is clean (e.g., tap water), mixing should be done shortly before the solution is used (using a meter pump or similar equipment) from a concentrated solution of peroxide. The concentrated solution can advantageously be between 35% and 70% by weight of the peroxide compound. A solution of 50% by weight of peroxide is also contemplated.

The preferred concentration of the peroxide compound after dilution is 1 to 2% by weight peroxide in water for disinfection or remediation purposes, although 0.5%-5% concentrations are considered to also be effective for shallow applications. For the deeper soil applications, such as injection wells, the higher concentrations of the peroxide source in the aqueous solution may be suitable.

Surfactant and Wetting Agents

Although the type of soil (sandy vs. loam, vs. clay, etc. as discussed above) to be treated has an effect on the rate of absorption, wetting agents, i.e., surfactants can be optionally included in the pesticide formulation to improve the wetting of the soil by the disinfecting solution, if the peroxide-based disinfectant is used as a liquid. The addition of a wetting agent can improve the wetting speed and completeness of the wetting, independent of the type of soil. Surfactants are commonly used as wetting agents to improve the penetration of agricultural chemicals. In some cases, the wetting agent could be an alcohol (to reduce surface tension) or a surfactant resistant to peroxide.

Surfactants may be used in soil remediation as well as agricultural applications. Besha et al., *Environmental Technology & Innovation*, 9 (2018) 303-322. In addition to the conventional ionic and nonionic surfactants, gemini or dimeric surfactants as well as biosurfactants can also be added to the peroxide-based soil treatment used for soil remediation due to their benign features like lower critical micelle concentration (CMC) values and better biocompatibility. Mixed surfactant systems and combined use of surfactants with other additives may also be used to improve the overall performance of the peroxide-based soil treatment solution when used for decontamination of soil. Mao et al., *Journal of Hazardous Materials*, Vol. 285, 21 Mar. 2015, Pages 419-435.

Other non-limiting examples of surfactants include: biodegradable sodium dodecyl sulfate (SDS), one of the most common ionic surfactants can contribute to an efficient removal of hydrophobic contaminants from soil when used with the peroxide-based soil treatment solution, with the optional additional of heat. Other commonly used non-limiting examples of suitable surfactants include cetyltriethyl ammonium bromide (CTAB), sodium dodecyl benzene sulfonate (SDBS), and cocamidopropyl betaine. Non-limiting examples of biosurfactants that may be used for soil remediation include but are not limited to glycolipid (e.g., rhamnolipids, fructose lipids, sophorolipids), lipopeptide (e.g., surfactin, polymyxin) compounds and humic substances. Examples of specific remediation surfactant blends are E-Mulse 3 and E-Mulse 10 from EthicalChem (South Windsor, Conn.).

Non-limiting examples of surfactants for use on cultivated land include: Dow Corning® Q2-5211 Superwetting Agent (Dow Corning, Midland, Mich.), T-MULZ® phosphate esters (Harcros Organics, Inc., Kansas City, Kans.), and the DOWFAX™ series of nonionic surfactants (Dow Chemical Co., Midland, Mich.), are suitable for use in agricultural applications and are commercially available. Other surfactants which include Triton H-66™ and Tergitol™ 15 S can be used for soil wetting. An efficacious amount, such as 0.01 to 2.5% of one or more surfactants can be added to the solution. The surfactants should also be compatible with hydrogen peroxide, peracetic acid, or such other peroxide as may be used in the solution if present in the formulation or mixed with the peroxide solution ahead of time.

Emulsifiers

The composition can contain an emulsifier. A number of emulsifiers and anti-foam agents suitable for agricultural use, such as T-MULZ® emulsifiers (Harcros Organics) and anionic and nonionic emulsifiers from Huntsman Surface Sciences (Houston, Tex.), are known in the art and are commercially available and suitable to use. Non-limiting examples of the emulsifier include potassium phosphates, such as potassium phosphate monobasic, dibasic, or tribasic (tripotassium phosphate), which not only help emulsify the solution and aid in its dispersal in the soil, but also act as chelating agents with metals in the soil. Tetrapotassium pyrophosphate is an example of a potassium phosphate for use in the compositions that can be used in the practice of this invention, for both or either of soil remediation and pesticidal purposes.

Chelating or Sequestering Agent

If an emulsifier that is not also a chelating agent is used, then a chelating or sequestering agent suitable for agricultural use, such as Agri-Sequest-All® (Sper Chemical Co., Clearwater, Fla.) may optionally be added to the pesticide formulation. Citric acid is a suitable chelating agent and 1 to 5% of citric acid can be included in the compositions used for the practice of the invention even if the emulsifier is also a chelating agent, and especially if no emulsifier is used.

Planting Time

Planting preferably is done approximately three days or later after treatment in order to ensure that the peroxide compound is sufficiently dissipated and that the disinfection and/or remediation process is complete.

Phytotoxicity

The peroxide-based soil treatment does not exhibit phytotoxicity; i.e., it does not harm plants.

Disinfection and Remediation Efficacy

Suitable disinfection and remediation of soils is exhibited by the peroxide-based treatment together with the heat, especially steam or hot vaporized aqueous peroxide solution.

Bacteria/Fungi/Insects/Nematodes

Non-limiting examples of organisms that are killed or immobilized by the peroxide and steam treatment described herein are: fungi such as: *Phytophthora cactorum, Rhizoctonia solani, Sclerotinia sclerotorum* (white mold), *Sclerotium rolfsii*; nematodes such as: *Meloidogyne arenaria*.

Peroxide and steam can both, alone or in combination, be efficacious against arthropods' eggs found in soil. Several arthropods may lay their eggs in the soil. For many arthropods, the consistently moist soil provides an ideal location for their eggs to develop. Some arthropods, such as root mealybugs, will spend their entire lives in the soil. Others, like fungus gnats, will only go through their immature life phases in the soil.

Other non-limiting examples of soil-borne plant pathogens include: plant pathogenic bacteria, virus, fungi, fungi-like organisms and nematodes in both annual and perennial crop production systems. Specific examples of soilborne plant pathogens and their associated diseases include *Fusarium* (root rot), *Phytophthora* (blight and root rots), *Pythium, Rhizoctonia, Ralstonia solanacearum* (brown rot, bacterial wilt), *Thielaviopsis*, and *Verticillium*. Other examples include the pathogens that cause charcoal rot and Panama disease.

Other examples include, but are not limited to, such soil-borne diseases as *Verticillium* wilt, caused by *Verticillium dahlia*; *Fusarium* wilt caused by *Fusarium oxysporum* f. sp. *Fragariae* and *Macrophomina*; and crown rot caused by *Macrophomina paseolina*, each of which is particularly troublesome for California strawberry production.

Still other examples are the following pathogens which attack young citrus trees: the burrowing nematode, *Radopholus citrophilus*, the causal agent of "spreading decline of citrus"; the citrus nematode, *Tylenchulus semipenetrans*, causal agent of "slow decline of citrus"; two species of lesion nematode, *Pratylenchus coffeae* and *P. brachyurus*, causal agents of "citrus slump"; and the sting nematode, *Belonolaimus longicaudatus*.

Other examples of pests that can be killed or immobilized are: *Meloidogyne incognita* (root knot nematode), *Globodera rostochiensis* and *Globodera pallida* nematodes and others. Adult, juvenile and egg stages of any nematode are contemplated to be targeted.

Traditional Fumigants

Along with the applied heat and the peroxide compounds described above, traditional fumigants may also be employed in the practice of the invention described herein. Non-limiting examples include: Chloropicrin, Dazomet, 1,3-Dichloropropene (Telone), Dimethyl disulfide (DMDS), Metam Sodium/Potassium, Methyl Bromide, or allyl isothiocyanate (AITC), ethanedinitrile (EDN), and methyl iodide. Other derivatives and chemicals that are known in the art can be used as well. The application of these traditional fumigants can be done prior to and/or post application of the above-mentioned peroxide compounds in order to further treat a soil under heavy disease pressure. It would not be beyond the scope of this disclosure to apply steam and a peroxide such as described above after treatment by a traditional fumigant or fumigants in order to avoid the necessary waiting time before planting that is generally necessary due to the phytotoxicity of the traditional fumigants. Soil treated with steam and peroxide according to this disclosure can be seeded only a few days after treatment. A person with knowledge in the art of fumigation will see a clear advantage in using the steam together with peroxide and prevent any further delay in planting as the steam and peroxide treatment does not generate any residues, and advantageously is performed at the same time as traditional cultivation of the soil.

Nematocides

It is within the scope of the invention disclosed herein that traditional nematocides can be used in solid/granular and liquid applications either before or after treatment or concurrently with the peroxide compounds described above.

The elimination of nematodes from some crops is essential for certain export requirements, particularly of high-value horticultural products. Chemical treatment with fumigants or nematocides may be the only technique available, and from the plant quarantine standpoint it is important that their use is restrained. The use of chemicals in protected cropping may still be preferable to other techniques such as steam treatment for economic and practical reasons.

Some nematocides are applied as liquid, prill, granular or emulsifiable liquids. Non-limiting examples of such products are for instance, those from the fumigant family (e.g., methyl bromide, 1,3 dichloropropene, ethylene dibromide, metam-sodium, Dazomet, methyl isothiocyanate, Chloropicrin); organophosphates (e.g., Thionazin, Ethoprophos, Fenamiphos, Fensulfothion, Terbufos, Isazofos, Ebufos); or carbamates (e.g., Aldicarb, Aldoxycarb, Oxamyl, Carbofuran, Cleothocarb). Organophosphates are another non-limiting example of compounds for controlling nematodes.

Soil Types

The steam or other source of heat as well as the peroxide-based disinfectant or soil remediation agent is contemplated to be usable in any type of soil or substrate that is typically used for agriculture or horticulture. The soil type and level of infestation and/or contamination by unwanted compounds or substances will of course affect the application rate (i.e., how much peroxide-based treatment and steam are applied), as will the amount of organic matter present in the soil.

Heavy soils such as clays having relatively small pore spaces are more difficult to treat than sandy soils which have larger pore sizes. Sandy soils which have larger pore sizes generally require less peroxide and do not need to be mixed as intensively as clays and heavy soils with relatively small pore sizes, which require more peroxide and more intensive mixing. Loam type soil would likely be intermediate in terms of mixing intensity and application level. Other variables such as the level of organics and infestation or amount of contaminants in the soil also need to be considered, as would be within the knowledge of a person with skill in the art.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method to treat soil, the method comprising a step of:
   a) applying a peroxide-based treatment to soil in open field, nursery or greenhouse and, applying a source of heat, to the soil, wherein the peroxide-based treatment and the source of heat are applied to the soil as a blend formed during application, and wherein the peroxide-based treatment comprises a source of peroxide and wherein the soil has an initial temperature; and
   concurrently with or within a time period of application of the peroxide-based treatment, of cultivating the soil, wherein the soil that is cultivated is at least 15 cm deep;
   wherein the application results in i) the peroxide-based treatment being mixed into the soil and ii) the temperature of the soil being raised above the initial temperature.

2. The method according to claim 1, wherein the peroxide-based treatment comprises an aqueous treatment solution and the aqueous treatment solution comprises the source of peroxide dissolved in water.

3. The method according to claim 2, wherein the aqueous treatment solution is applied to the soil at a rate of between 100 liters per hectare and 6000 liters per hectare.

4. The method according to claim 2, wherein the aqueous treatment solution comprises at least 0.1% by weight of the source of peroxide.

5. The method according to claim 2, wherein the aqueous treatment solution further comprises a surfactant or a wetting agent.

6. The method according to claim 5, wherein the wetting agent or surfactant is selected from the group consisting of alcohols, non-ionic surfactants, dimeric surfactants, biosurfactants, phosphate esters, and mixtures thereof.

7. The method according to claim 5, wherein the surfactant or wetting agent is present in the aqueous treatment solution at a level of at least 0.01 percent by weight.

8. The method according to claim 2, wherein the aqueous treatment solution is applied as a hot vaporized solution.

9. The method according to claim 1, wherein the source of heat comprises steam.

10. The method according to claim 9, wherein the steam is applied using pressure.

11. The method according to claim 1 wherein the peroxide-based treatment comprises a granular solid.

12. The method according to claim 1, wherein the source of peroxide is selected from the group consisting of hydrogen peroxide, perborates, percarbonates, organic peroxides, persulfate salts, peroxyacids, peroxyesters, peroxyketals and mixtures thereof.

13. The method according to claim 1, wherein the source of peroxide comprises hydrogen peroxide.

14. The method according to claim 1, wherein the source of peroxide comprises peracetic acid.

15. The method according to claim 1, further comprising, after step b), a step c) wherein the soil surface is leveled and consolidated by a rotating harrow and a step d) wherein the soil is compacted by a power driven roller after the peroxide-based treatment is applied and mixed into the soil.

16. The method according to claim 1, wherein the method further comprises, after step b), a step of sieving the cultivated soil.

17. The method according to claim 1, wherein the method further comprises, as a final step, a step of applying a layer of polymer film on top of the soil.

18. The method according to claim 1, wherein the aqueous treatment solution is applied using pressure.

19. The method according claim 1, wherein the source of peroxide further comprises a catalyst for promoting the decomposition of the peroxide.

20. The method according to claim 19 wherein the catalyst is selected from the group consisting of a source of iron (II), a source of iron (III) and mixtures thereof.

* * * * *